United States Patent
Rana et al.

(10) Patent No.: US 11,531,501 B1
(45) Date of Patent: Dec. 20, 2022

(54) COLLABORATIVE DECISION MAKING IN DYNAMICALLY CHANGING ENVIRONMENT

(71) Applicant: Agile Systems, LLC, Rochester, MI (US)

(72) Inventors: Satyendra Pal Rana, Austin, TX (US); Ekrem Alper Murat, Shelby Township, MI (US); Ratna Babu Chinnam, Rochester, MI (US)

(73) Assignee: Agile Systems, LLC, Rochester, MI (US)

( * ) Notice: Subject to any disclaimer, the term of this patent is extended or adjusted under 35 U.S.C. 154(b) by 0 days.

(21) Appl. No.: 17/643,635

(22) Filed: Dec. 10, 2021

(51) Int. Cl.
*G06F 3/08* (2006.01)
*G06F 16/903* (2019.01)

(52) U.S. Cl.
CPC .......... *G06F 3/08* (2013.01); *G06F 16/90335* (2019.01)

(58) Field of Classification Search
None
See application file for complete search history.

(56) References Cited

U.S. PATENT DOCUMENTS

2022/0091669 A1\* 3/2022 Krishna ................ G06N 20/00

\* cited by examiner

*Primary Examiner* — David R Vincent
(74) *Attorney, Agent, or Firm* — FisherBroyles, LLP; Susan M. Oiler (57) ABSTRACT

Disclosed is a system and a method for collaborative decision making in dynamically changing environment. A query corresponding to a problem is received from a user. Further, one or more intermediate steps required to reach a decision is calculated based on metadata associated to the problem. A decision-making flow is established for the one or more intermediate steps required to reach the decision. It may be noted that the decision-making flow corresponds to a sequence for execution of the one or more intermediate steps. Further, a decision space comprising one or more decision options is generated. The decision space is dynamically modified based on one or more uncertain events. A decision knowledge graph depicting modifications in the decision space is generated. Further, the decision space and the decision knowledge graph are updated. Finally, the decision is selected based on the updated decision knowledge graph and the updated decision space.

9 Claims, 2 Drawing Sheets

COLLABORATIVE DECISION MAKING IN DYNAMICALLY CHANGING ENVIRONMENT

TECHNICAL FIELD

The present subject matter described herein, in general, relates to a system and a method for utilizing automation in a decision making, and more particularly to utilization of automation in man-machine collaborative decision making in dynamically changing environment.

BACKGROUND

Decision making is a complex process that involves analysis of the data. Making an informed decision has been simplified with increased digitization and improvement in the computer technology. The internet has played an important role in making the data readily available for everyone to use. Machines can now execute jobs that were previously only possible for humans, such as making decisions, thanks to technological advancements and the introduction of artificial intelligence and deep learning. The decision making is relevant to any field of human endeavour some examples may be Resource management, service management, government, commercial industry, asset management, security management, and a host of other fields that require decision making. There are various systems available for assisting humans in decision making as processing data from a repository is not a difficult task for a machine. The various systems available today have one common problem. The world is dynamic and most of the processes that we come across in our daily lives are non-linear and depend on dynamic, interdependent parameters which makes it difficult for the various systems to comprehend real-life situations and arrive at a conclusion.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for collaborative decision making in dynamically changing environment. This summary is not intended to identify essential features of the claimed subject matter nor is it intended for use in determining or limiting the scope of the claimed subject matter.

In one implementation, a system for collaborative decision making in dynamically changing environment is disclosed. The system may receive a query from a user. It may be noted that the query may correspond to a problem requiring a decision. Further, one or more intermediate steps may be calculated required to reach the decision based on metadata associated to the problem. The one or more intermediate steps may be calculated using deep learning algorithms, reinforcement learning and artificial intelligence techniques. Further, the system may establish a decision-making flow for the one or more intermediate steps required to reach the decision. The decision-making flow may correspond to a sequence for execution of the one or more intermediate steps. The sequence may be determined based on an importance and a severity of the one or more intermediate steps using reinforcement learning and artificial intelligence techniques. Subsequently, a decision space comprising one or more decision options may be generated. The one or more decision options may be calculated based on the decision-making flow using artificial intelligence techniques and reinforcement learning. Further, the decision space may be dynamically modified based on one or more uncertain events. The one or more uncertain events may create an uncertain impact on the decision-making flow. The one or more uncertain events may be determined based on new information received in real time. Further, a decision knowledge graph depicting the modifications in the decision space may be generated. The modifications may indicate addition of the one or more new decision options or removal of the one or more decision options. Furthermore, the decision space and the decision knowledge graph may be updated. The decision space may be updated post validation of the decision knowledge graph by the one or more human agents. Finally, the decision may be selected based on the updated decision knowledge graph and the updated decision space. It may be noted that the final decision is selected post approval of the one or more human agents.

In yet another implementation, non-transitory computer readable medium embodying a program executable in a computing device for collaborative decision making in dynamically changing environment is disclosed. The program may comprise a program code for receiving a query, from a user, corresponding to a problem requiring a decision. Further, the program may comprise a program code for calculating one or more intermediate steps to reach the decision based on metadata associated to the problem. The one or more intermediate steps may be calculated using reinforcement learning, deep learning algorithms and artificial intelligence techniques. The program may then comprise a program code for establishing a decision-making flow for the one or more intermediate steps required to reach the decision. It may be noted that the decision-making flow may correspond to a sequence for execution of the one or more intermediate steps. The sequence may be determined based on an importance and a severity of the one or more intermediate steps using reinforced learning and artificial intelligence techniques. Subsequently, the program may comprise a program code for generating a decision space comprising one or more decision options. The one or more decision options may be calculated based on the decision-making flow using artificial intelligence techniques and reinforcement learning. Further, the program may comprise a program code for dynamically modifying the decision space based on one or more uncertain events. The one or more uncertain events may create an uncertain impact on the decision-making flow. The one or more uncertain events may be determined based on new information received in real time. Further, the program may comprise a program code for generating a decision knowledge graph depicting modifications in the decision space. The modifications may indicate addition of the one or more new decision options or removal of the one or more decision options. Furthermore, the program may comprise a program code for updating the decision space and the decision knowledge graph. The decision space may be updated post validation of the decision knowledge graph by the one or more human agents. Finally, the program may comprise a program code for selecting a decision based on the updated decision knowledge graph and the updated decision space. It may be noted that the decision may be approved by the one or more human agents.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for collaborative decision making in dynamically changing environment disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "calculating," "establishing," "generating," "modifying," "updating," "selecting," and other forms thereof, are intended to be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a system and a method for collaborative decision making in dynamically changing environment. It may be noted that the present subject matter mainly focuses on complex decision scenarios with high stakes. The complex decision scenarios require a great deal of deliberation because of the risk and reward associated with consequences of decision-implementing action. The complexity of the act of decision-making emanates from various dimensions of the decision-making problem, such as:

The sheer number of factors to be considered in the decision;

Multiple and conflicting goals;

Multiple human agents, each pushing their own perspectives;

Long duration of decision-making and decision implementing actions, during which many factors can change;

Ambiguity and uncertainty of available information;

Human factors—such as differing viewpoints, levels of skills and experience of decision contributors, and the effects of political and other social relationships; and High risk of not obtaining the desired outcome, and of unintended consequences.

The present invention is focused on making strategic decisions in a highly uncertain, risk-prone, and dynamically changing environment. Initially, a user may submit a query corresponding to a problem to the system. Further, the system calculates one or more intermediates steps to reach a decision based on metadata. The metadata may comprise a goal, constraints, success measures, a list of the one or more human agents involved in a collaborative decision making. Further, the system determines an order in which the one or more intermediates steps must be taken. In an example, a query entered by the user may be "Expand business into a new territory" or "Buy a new house". Further, the system calculates the one or more intermediate steps and ranks them based on the order of execution. Furthermore, the system generates a decision space comprising one or more decision options calculated based on the decision-making flow. It may be noted that the decision space may be modified based on one or more uncertain events. The uncertain event may be anything such as "Financial Problem, a particular news impacting the decision, natural calamities, chip shortage news for automobile industry, Suez canal obstruction, etc." Further, a decision knowledge graph is generated based on the modifications in the decision space. It may be noted that decision space and the decision knowledge graph may be updated by human agents. Finally, a decision is selected based on the updated decision knowledge graph and the updated decision space.

Figure 1:
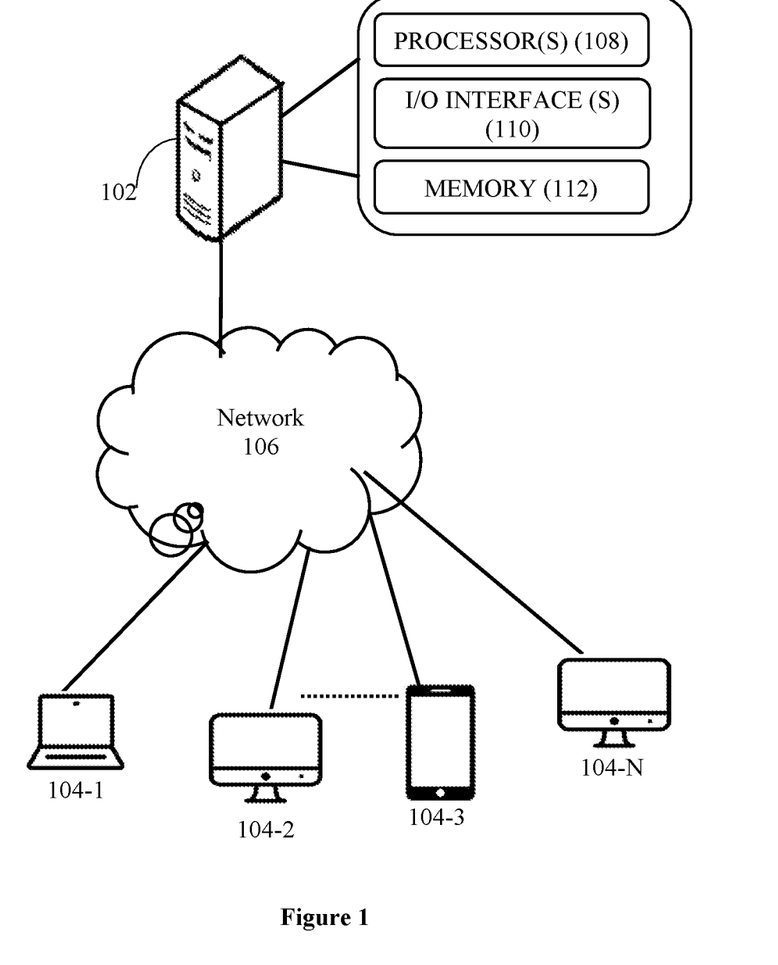
FIG. 1 illustrates a network implementation for collaborative decision making in dynamically changing environment, in accordance with an embodiment of the present subject matter.

Referring now to FIG. 1, a network implementation 100 of a system 102 for collaborative decision making in dynamically changing environment is disclosed. Initially, the system 102 receives a query corresponding to a problem from a user. It may be noted that a decision is required for the problem. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives a query corresponding to a problem from one or more user devices 104. Further, the system may also 102 receive feedback from a user using the user devices 104. Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random-access memory (SRAM) and dynamic random-access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for collaborative decision making in dynamically changing environment. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for collaborative decision making in dynamically changing environment. The system may receive a query from a user. It may be noted that the query corresponds to a problem requiring a decision. In an embodiment, the query may be "Expand business into a new territory," or "Buy a house," or "Find a cure for COVID," or "Make a career move" or alike.

Further to receiving the query, the system 102 may calculate one or more intermediate steps required to reach a decision based on metadata associated to the problem. It may be noted that the one or more intermediate steps are calculated using reinforcement learning, deep learning algorithms and artificial intelligence techniques. In an embodiment, the one or more intermediate steps may also be calculated using combination of the reinforcement learning, deep learning algorithms, mathematical modelling, and artificial intelligence techniques. The metadata may comprise a goal, constraints, success measures, a list of the one or more human agents involved in a collaborative decision making. The list of the one or more human agents may define the roles and seniority of each of the one or more human agents. The goal may represent the objective or final expectation of the user. The constraints may represent the limitations of resources available to achieve the goal. The success measures may represent the parameters used for confirmation of achievement of the goal.

The one or more human agents may be assigned below roles:

Decision-Maker—A person having an authority to make a decision. The authority may be essential to allocate resources to implement the decision. There may be multiple decision-makers involved in a decision program.

Stakeholder—A person affected by a decision. There may be multiple stakeholders in a decision program bringing in diverse perspectives.

Expert—A person having knowledge relevant to the generation of a decision space. The expert may assess the characteristics of a decision point in the space.

Decision Program Manager—An individual responsible for decision program life-cycle operations.

Decision Intelligence Manager—An individual responsible for configuring and setting up the system.

System Administrator—An individual responsible for the operational management of the system.

Subsequent to calculating the one or more intermediate steps, the system 102 may establish a decision-making flow for the one or more intermediate steps required to reach the decision. The decision-making flow may correspond to a sequence for execution of the one or more intermediate steps. The sequence may be determined based on an importance and a severity of the one or more intermediate steps using reinforcement learning and artificial intelligence techniques. The importance and the severity of the one or more intermediate steps may be determined based on impact of each intermediate step on the decision. The impact of each intermediate step may be calculated using predictive algorithms. In an embodiment, a decision of an intermediate step may be referred as an intermediate decision.

In an embodiment, let us assume that one or more intermediate steps are A, B, C, D, and E. Further, the system may determine a sequence for execution of the one or more intermediate steps. Let us assume that the order may be "C, B, D A, and E". It may be noted that the order may be determined based on an importance and a severity of the one or more intermediate steps.

Further to establishing the decision-making flow, the system 102 may generate a decision space comprising one or more decision options. The one or more decision options may be calculated based on the decision-making flow using artificial intelligence and reinforcement learning techniques. In an embodiment, the decision space may be empty initially. It may be noted that the decision space may represent a criteria to limit the one or more decision options. The decision space may be modified by changing the criteria during the decision-making flow. The decision space may be modified at least by the one or more human agents or when an uncertain event occurs. The decision space may be filled dynamically, during the decision-making flow, with the decision options that fit the criteria.

A decision option may represent a possible choice for decision content of a decision in a decision implementing intention. It may be noted that the decision-space may be a set whose members are decision options. The members may be added or removed from the set during the act of decision-making as new information is obtained. A snapshot of the decision space at a point in time contains all members under consideration at that time. A decision space model may be a compact representation of the decision space when it is impractical to explicitly list all members in the space. When needed, members of the decision space can be generated by executing a generation procedure associated with the decision-space model.

Further to generating the decision space, the system 102 may modify the decision space based on one or more uncertain events. The modification may indicate addition of one or more new decision options or removal of one or more decision options. The one or more new decision options may be calculated based on the new information or uncertain events. Similarly, the removal of the one or more decision options may be based on the new information or uncertain events. The one or more uncertain events may create an uncertain impact on the decision-making flow. The uncertain impact may be calculated using predictive algorithms and artificial intelligence techniques. In an embodiment, the one or more uncertain events may be eliminated when the uncertain impact is less than a predefined threshold.

It may be noted that the one or more uncertain events may lead to a risk having consequences. The one or more risk may be calculated using Artificial Intelligence Techniques. The consequences may be predicted and calculated using predictive algorithms and artificial intelligence techniques. Consider an example, a company wants to hire employees (a problem). The one or more risk associated with the problem may be at least the company received zero applications, zero applicants qualified for the interview, an applicant rejected an offer letter, incompetent candidate got hired, applicant quits after being hired, and alike. It may be noted that the system calculates the consequence for each risk. In an embodiment, the system may suggest preventive measures or risk informed strategy to reduce the impact of the consequences. The risk may be low, medium, or high based on the impact of the consequences. In another embodiment, the impact of the consequences may be a short term, medium term, or a long term. In yet another embodiment, the system assists the one or more human agents to select an intermediate decision to avoid risk.

The one or more uncertain events may be determined based on new information. The system may receive new information from external data sources and the input from the one or more human agents at the one or more intermediate step based on the importance and the severity of the step. The external data source may comprise internet search, monitoring changes in published data repositories, subscription to market research services, and analysis of news and social media content. In an embodiment, the input from the one or more human agents may be a judgement, an additional decision option, or alike. The new information may be used to calculate the one or more uncertain events or execute consequent intermediate steps in the decision-making flow. In an embodiment, the system 102 may nudge a human agent from the one or more human agents for the input based on a predefined matrix of roles and seniority of the human agent.

It may be noted that the system may filter the new information based on merit. The merit may be calculated by using Artificial Intelligence (AI) techniques, Mathematical Modelling, Markov Decision Modelling, and Deep Learning (DL) algorithms on factors like human bias, historic user judgements, consequences and credibility of the external data source.

After modifying the decision space, the system 102 may generate a decision knowledge graph depicting modifications in the decision space. The decision knowledge graph may comprise data related to the modifications in the decision space. The decision knowledge graph may be a semantic knowledge graph comprising a list of new decision options added in the decision space, list of decision options removed from the decision space, a reason for the addition and the removal of the decision options from the decision space, and the intermediate step when the decision space got modified. The reason for the addition or the removal of the decision options may be caused due to an uncertain event or the new information.

It may be noted that the system uses a unique shared semantic graph, referred to as the decision knowledge graph, depicting the evolution of the decision-space during the act of decision-making. The building of the decision knowledge graph may be completed when the decision knowledge graph has enough knowledge to form a decision-implementing intention. The completed decision knowledge graph can be simply queried to retrieve information such as:

Information content of the decision (What must guide the decision implementing action?)

The trigger information for the decision implementing information

Explanation behind what led to commitment to the decision

Why and when another alternative got eliminated from consideration?

The quantified value and risk associated with decision

Under what circumstances, the decision will cease to be the preferred choice

Further to generating the decision space, the system 102 may update the decision space and the decision knowledge graph. The decision space may be updated post validation of the decision knowledge graph by the one or more human agents. In an embodiment, the one or more human agents may provide feedback on the decision space. In another embodiment, the system may train based on the feedback provided by the one or more input. It may be noted that system continuously learns from the one or more human agents in order to improve the efficiency of the system. In an embodiment, when the one or more human agents reject the modifications in the decision space depicted in the decision knowledge graph the system may again modify the decision space. Further, the system may also reconsider the uncertain events.

Further to updating, the system 102 may select the decision based on the updated decision knowledge graph and the updated decision space. The final decision may be selected post approval of the one or more human agents. In an embodiment, the decision may be selected by a process of eliminating the one or more decision options from the decision space. It may be noted that the one or more decision options that fails to match the criteria or the goal or the constraints may be eliminated.

In an embodiment, the system 102 may reinitiate the collaborative decision making when no decision satisfies the goals, constraints and success measures or does not receive approval of the human agents. It may be noted that the decision may be selected from the updated decision space.

Consider an example, let us assume that a user is a representative of an organisation. The system may receive a query corresponding to a problem from the user. Let's assume that the problem is "hiring interns". The system may define the problem using metadata. The metadata may comprise a goal, constraints, success measures and a list of human agents. In the above example, let's assume that the goal is "hiring eight interns from a legal background". Further, the constraints may be "the stipend offered should not exceed Rs. 10,000," "the interns must join on 1 Jan. 2022," "The intern must be a law graduate," and "the interns must be hired for a period of six months". Let's assume that the success measures are "the interns join on 1 Jan. 2022," "the interns work until 1 Jul. 2022," "eight interns must be hired," "the interns must be from law background," and "the interns must be chosen from a list of applicants." In the example, the one or more human agents involved may be a head of human resources, an associate human resources manager, a head of legal department, and a first-year associate. The system may calculate one or more intermediate steps to select eight interns out of the list of the applicants that fulfil the goals, constraints and success measures. Further, the system may establish a decision-making flow for the one or more intermediate steps by arranging them in a sequence. Let's assume the decision-making flow for the one or more intermediate steps for the given example is 1. Receive the list of applicants from the associate human resources
2. Ask the head of the human resources to confirm the list of the applicants and receive amendments, if any.
3. Filter the applicants from the list of the applicants and share the filtered list of the applicants with the head of the legal department
4. Receive amendments in the filtered list of the applicants from the head of the legal department, if any and prepare a final list of applicants.
5. Share the final list of the applicants with the $1^{st}$ year associate for assessment.
6. Receive results of the assessment from the $1^{st}$ year associate.
7. Add new applicants to the final list of the applicants if any is eliminated in the assessment process and share the new applicants with the $1^{st}$ year associate for assessment.
8. Reiterate steps 5, 6 and 7 until eight interns are finalised.
9. Share the list of eight interns to hire with Associate Human Resources to validate.

A decision space comprising a plurality of decision options may be generated. The plurality of decision options may comprise the list of the applicants. The decision space may be modified at every step based on the inputs from the human agents and analysis. Considering the above example, the system may identify a risk that the list of applicants is not enough to select eight interns. The system may calculate the consequence of the risk that sufficient interns are not found out of the list of applicants. In an embodiment, the consequences may impact the growth of the organization, or efficiency of the employees, or alike. In order to reduce the impact of the consequence, the system may determine a risk informed strategy. In an embodiment, the system may provide predictive suggestion to the one or more human agents to obtain more applicants for the list of applicants. The system may nudge the associate human resources manager to obtain more applicants. The list of applicants may be modified based on the system's suggestion and the input from the associate human resources manager. The associate human resources manager may also choose to ignore the system's suggestion after reviewing the consequences and risk. Let's assume that the suggestion was ignored. The system may continuously monitor the activity of the list of the applicants on social media and check for any emails from any applicants for any new information. Consider an example, the system may identify that an applicant from the list of applicants joined a competitor firm for the period 1 Jan.-1 Jul. 2022 from a database of professional workers or social media. This may be considered as an uncertain event which may lead to removal of the applicant from the decision space. A decision knowledge graph may be generated that depicts all the modifications made in the decision space.

For the above example, let's assume that the associate human resources manager shares a list of 80 applicants. The head of human resources amends the list and removes 10 applicants. The decision knowledge graph depicts this modification and shows that the list was modified at Step 2 by the head of human resources and 10 applicants were removed from the decision space. Any other modifications made during the decision-making flow will also be recorded in a similar manner. When the system reaches a decision, the stakeholders may validate the decision knowledge graph and check all the modifications and provide feedback. The system may select a final decision. For this example, the final decision may be the list of eight interns to be hired.

Consider another example, let us assume that a user is representative of an organization. The system may receive a query corresponding to a problem the user is confronting. Let us assume that the problem is about deciding on a concept for a new product (for example, a flying car) that meets the needs of an emerging marketplace better than competing products. The system may define the problem using metadata. The metadata may comprise a goal, constraints, success measures, and a list of human agents. Let us assume that the goal is to develop an engineered product (for example, a flying car) conforming to the decided concept. The product concept is defined as a combination of capabilities (for example—seating capacity, engine type, flying height, etc.) whereas each capability has multiple options (for example, engine type may be gasoline, hybrid, plug-in hybrid, or fully electric motor).

Further the constraints may be that the product concept must be finalized within 6 months, and the concept development cost must not exceed $2 million. Let us assume that the success measures are "the concept must be feasible to manufacture", "the total per unit manufacturing cost should not exceed $15,000", "the product should have zero defects", and "the product must be ready to hit the market in 2 years after concept development".

In the example, the one or more human agents may be market researchers who represent the perceived needs of the marketplace, product manager, technology subject matter experts and chief financial officer.

Further, the system may calculate one or more intermediate steps to reach the decision that fulfil the goals, constraints, and success measures, and for selecting the best concept. Further, the system may establish a decision-making flow for the one or more intermediate steps by arranging them in an optimal sequence.

Let us assume that the decision making flow for the one or more intermediate steps for the given example is:

1. Receive the list of requirements from market researchers.
2. Develop a list of distinct product concept capabilities to meet the requirements.
3. For each capability, identify a list of discrete capability concept variations as options for achieving that capability. This may involve ideas from technology subject-matter experts and/or searching an existing knowledge base for the product domain.
4. Assess each capability option in terms of design and manufacturing feasibility within the given constraints. This assessment may involve judgements from technology subject-matter experts, and artificial intelligence techniques to infer infeasibility.
5. Eliminate capability options which are infeasible.
6. Generate all possible product concepts by combining a feasible option from each of the identified capabilities. This may require describing product concepts by one or more decision space membership rules as explicit enumeration of all concepts may be quite complex to handle.
7. Not all concepts in step 6 may be valid because of dependencies among options of different capabilities. That is certain options may not work together in a concept whereas certain option combinations may always have to work together. Identify such dependencies by consulting subject-matter experts and leveraging prior product domain knowledge.
8. Efficiently eliminate invalid product concepts from further consideration at the right moment.
9. If the list of remaining product concepts is small or the time and budget for concept development is exhausted, go to step 14 otherwise go to step 10.
10. Select a subset of product concepts to be evaluated further. This is accomplished by using a criteria which is likely to lead to faster and cheaper convergence to the final product concept.
11. Evaluate each product concept in terms of success criteria attributes and relative preference attributes.
12. Eliminate all product concepts from further consideration which are inferior to some other remaining product concept as informed by step 11 and are likely to remain so in spite of new information in the target time frame for decision making.
13. Re-iterate steps 9-12.
14. Compare all remaining product concepts to select the most desirable product concept.

Further to establishing decision making flow, a decision space comprising a plurality of decision options may be generated. The plurality of decision options may comprise the list of all product concepts which may be explicitly recorded or described by the one or more decision space membership rules. Using the one or more decision space membership rules, one can infer whether or not an arbitrary product concept belongs to the decision space. The decision space may be modified at each step based on the inputs from the one or more human agents and analysis. Considering the above example, the system may identify a risk that the identified product concepts may not be adequate to explore newer and novel capabilities. The system may calculate the consequences of the risk to the organization. In an embodiment, the consequences may impact the competitiveness of the manufactured product conforming to the selected concept, thereby, reducing the market share of the organization. In order to alleviate or minimize unintended consequential risk, the system may determine a risk informed strategy.

In an embodiment, the system may provide a predictive suggestion to the one or more human agents to generate more product concepts. The system may nudge the product manager and the technology subject matter experts to consider newer capabilities in arriving at an expanded list of product concepts. The list of product concepts may be modified based on the system's suggestion and the input from technology subject matter experts (human agents). The product manager may also choose to ignore the system's suggestion after reviewing the consequences and risk. Let us assume that the suggestion was ignored. The system may continuously monitor developments in the marketplace which may influence the current perception of the risk. For example, newer experiences with flying car concepts may indicate that flying below or above a certain height has unacceptable safety risks. It may also be the case that a new regulation is passed which may impose a restriction on the flying height. This will be considered as an uncertain event which may invalidate an existing capability option and suggest one or more new capability options thereby impacting the decision space (product concept space). A decision knowledge graph may be generated that depicts all the modifications made in the decision space along with the rationale for modifications.

Further, the decision knowledge graph and the decision space may be updated post validation of one or more human agents. Finally, a decision is selected based on the updated decision knowledge graph. It may be noted that the decision is selected after consideration of all the uncertain events (e.g. restriction on the flying height). The final decision may be a flying car that meets the expectation of the user. When the user is not satisfied with the final decision the process is reiterated.

In an embodiment, the system 102 may also be referred as a decision intelligence system. It may be noted that the decision intelligence system is an adaptive and intelligent automated system that collaborates with human decision-maker (decision-making group or human agents) to help transition them from decision-making intention mental state to decision-implementing intention state.

Figure 2:
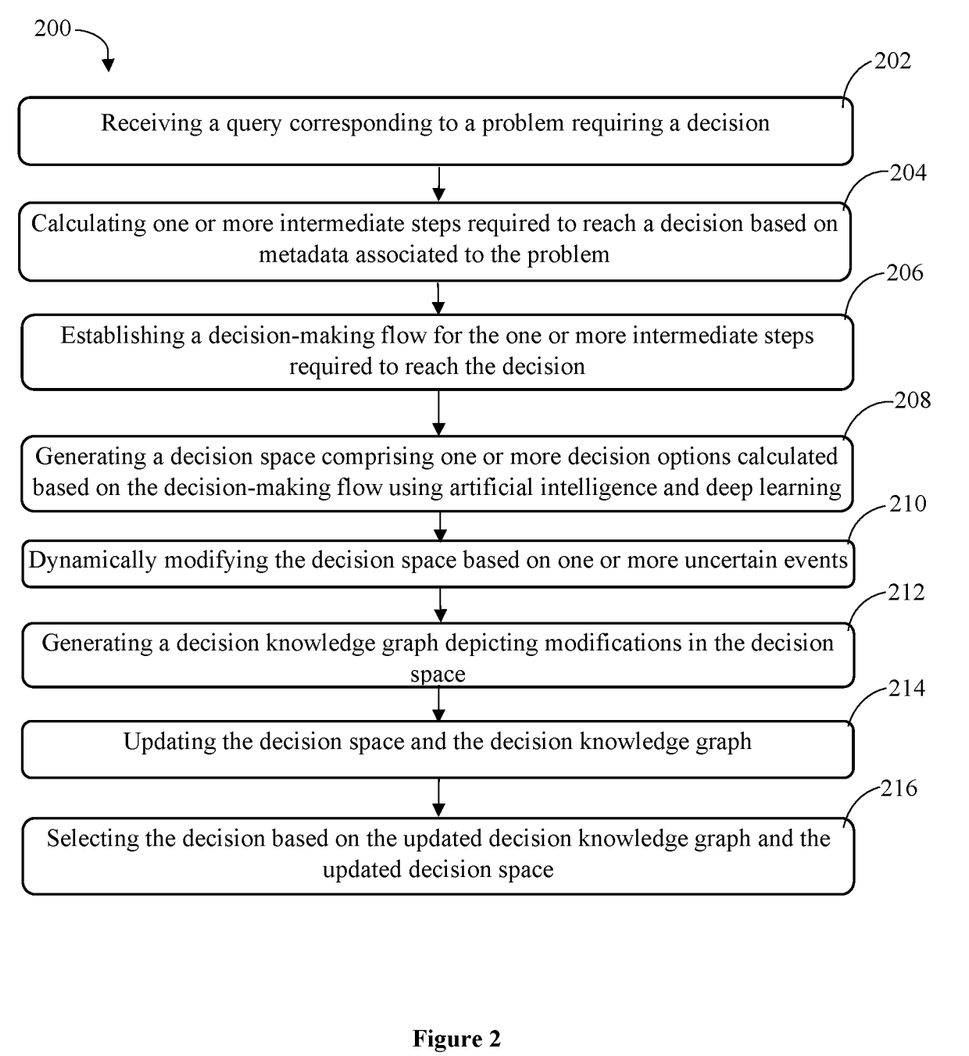
FIG. 2 illustrates a method for collaborative decision making in dynamically changing environment, in accordance with an embodiment of the present subject matter.

Referring now to FIG. 2, a method 200 for collaborative decision making in dynamically changing environment is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for collaborative decision making in dynamically changing environment. Additionally, individual blocks may be deleted from the method 200 without departing from the scope of the subject matter described herein. Furthermore, the method 200 for collaborative decision making in dynamically changing environment can be implemented in any suitable hardware, software, firmware, or combination thereof. However, for ease of explanation, in the embodiments described below the method 200 may be considered to be implemented in the above-described system 102.

At block 202, a query corresponding to a problem for which a decision is required may be received from a user.

At block 204, one or more intermediate steps required to reach a decision may be calculated based on metadata. The one or more intermediate steps may be calculated using reinforcement learning, deep learning and artificial intelligence algorithms. The metadata may be associated to the problem.

At block 206, a decision-making flow for the one or more intermediate steps required to reach the decision may be established. The decision-making flow may correspond to an order in which the one or more intermediate steps must be taken. The order may be determined based on an importance and a severity of the one or more intermediate steps using reinforcement learning and artificial intelligence techniques.

At block 208, a decision space comprising one or more decision options may be generated. The decision space may be calculated based on the decision-making flow using artificial intelligence and deep learning.

At block 210, the decision space may be modified based on one or more uncertain events. The one or more uncertain events may create an uncertain impact on the decision-making flow. The one or more uncertain events may be determined based on new information.

At block 212, a decision knowledge graph depicting modifications in the decision space may be generated.

At block 214, the decision space and the decision knowledge graph may be updated. The decision space may be updated post validation of the decision knowledge graph by the one or more human agents.

At block 216, the decision may be selected based on the updated decision knowledge graph and the updated decision space. The final decision may be selected post approval of the one or more human agents.

Exemplary embodiments discussed above may provide certain advantages. Though not required to practice aspects of the disclosure, these advantages may include those provided by the following features.

In some embodiments, the system may improve efficiency and speed of the decision-making.

In some embodiments, the system provides better decisions due to the involvement of human agents in the decision-making process.

In some embodiments, the system may help in reduction of manpower by automating managerial tasks, making decisions on behalf of the humans.

In some embodiments, the system may help in streamlining conversations between the one or more human agents involved in the decision-making process.

In some embodiments, the system alerts a user for an uncertain event impacting the decision.

In some embodiments, the system may augment the decision when there is an uncertain event creating an uncertain impact on the decision.

In some embodiments, the system may help to reduce the impact of the one or more uncertain events.

Although implementations for methods and the systems for collaborative decision making in dynamically changing environment have been described in a language specific to structural features and/or methods, it is to be understood that the appended claims are not necessarily limited to the specific features or methods described. Rather, the specific features and methods are disclosed as examples of implementations for collaborative decision making in dynamically changing environment.

What is claimed is:

1. A system for collaborative decision making in a dynamically changing environment, the system comprises:
   a memory; and
   a processor coupled to the memory, wherein the processor is configured to execute instructions stored in the memory for:
   receiving a query from a user using a graphical user interface (GUI), wherein the query corresponds to a problem requiring a decision;
   determining one or more intermediate steps required to reach the decision based on metadata associated to the problem, wherein the one or more intermediate steps are calculated using deep learning algorithms and artificial intelligence techniques;
   establishing a decision-making flow for the one or more intermediate steps required to reach the decision, wherein the decision-making flow corresponds to a sequence for execution of the one or more intermediate steps, and wherein the sequence is determined based on an importance and a severity of the one or more intermediate steps using deep learning algorithms;
   generating a decision space comprising one or more decision options, and wherein the one or more decision options are calculated based on the decision-making flow using artificial intelligence techniques and deep learning algorithms;
   crawling external data sources to automatically extract new information related to the decision space, wherein the external data sources comprise the internet, published data repositories, online market research publications, e-news and social media sites;
   determining merit of the new information based on a set of factors comprising historic judgements, consequences, and credibility of the external data source, wherein the merit is determined using at least Artificial Intelligence (AI) techniques, Mathematical Modelling, Markov Decision Modelling, and Deep Learning (DL) algorithms based on the set of factors;
   identifying one or more uncertain events based on the new information, wherein the one or more uncertain events cause an uncertain impact on the decision-making flow;
   calculating the uncertain impact caused by the one or more uncertain events using predictive algorithms and machine learning techniques, wherein the predictive algorithms are continuously trained based on reinforcement techniques;
   dynamically modifying the decision space based on the uncertain impact corresponding to the one or more uncertain events, wherein the decision space is modified by at least one of adding one or more decision options, and removing one or more decision options;
   generating a decision knowledge graph depicting each modification in the decision space based on the modified decision space;
   updating the decision space and the decision knowledge graph based on feedback, wherein the feedback is at least one of accepting and rejecting one or more decision options in the decision space;

continuously training the predictive algorithms based on the feedback, wherein the predictive algorithms are continuously trained to dynamically modify the decision space based on the uncertain impact; and selecting the decision based on the updated decision knowledge graph and the updated decision space, wherein a final decision is selected post approval of the selected decision from the one or more human agents.

2. The system as claimed in claim 1, wherein the metadata comprises a goal, constraints, success measures, a list of the one or more human agents involved in a collaborative decision making, and wherein the list of the one or more human agents defines the roles and seniority of each of the one or more human agents.

3. The system as claimed in claim 2, wherein the goal represents the objective or final expectation of the user, and the constraints represent the limitations of resources available to achieve the goal and the success measures represent the parameters used for confirmation of achievement of the goal.

4. The system as claimed in claim 1, wherein the importance and the severity of the one or more intermediate steps are determined based on an impact of each intermediate step on the decision, wherein the impact of each intermediate step is calculated using predictive algorithms.

5. The system as claimed in claim 1, wherein the one or more uncertain events with the uncertain impact less than a predefined threshold are eliminated.

6. The system as claimed in claim 1, wherein the decision knowledge graph comprises data related to the modifications in the decision space, wherein the decision knowledge graph is a semantic knowledge graph comprising a list of new decision options added in the decision space, a list of decision options removed from the decision space, a reason for the addition and the removal of the decision options from the decision space, and the intermediate step when the decision space got modified.

7. A method for collaborative decision making in a dynamically changing environment, the method comprises:
   receiving, by a processor, a query from a user using a graphical user interface (GUI), wherein the query corresponds to a problem requiring a decision;
   determining, by the processor, one or more intermediate steps required to reach the decision based on metadata associated to the problem, wherein the one or more intermediate steps are calculated using deep learning algorithms and artificial intelligence techniques;
   establishing, by the processor, a decision-making flow for the one or more intermediate steps required to reach the decision, wherein the decision-making flow corresponds to a sequence for execution of the one or more intermediate steps, and wherein the sequence is determined based on an importance and a severity of the one or more intermediate steps using deep learning algorithms;
   generating, by the processor, a decision space comprising one or more decision options, and wherein the one or more decision options are calculated based on the decision-making flow using artificial intelligence techniques and deep learning algorithms;
   crawling, by the processor, external data sources to automatically extract new information related to the decision space, wherein the external data sources comprise internet search, monitoring changes in published data repositories, subscription to market research services, and analysis of news and social media content;
   determining, by the processor, merit of the new information based on a set of factors comprising historic judgements, consequences, and credibility of the external data source, wherein the merit is determined using at least Artificial Intelligence (AI) techniques, Mathematical Modelling, Markov Decision Modelling, and Deep Learning (DL) algorithms on the set of factors;
   identifying, by the processor, one or more uncertain events based on the new information, wherein the one or more uncertain events cause an uncertain impact on the decision-making flow;
   calculating, by the processor, the uncertain impact caused by the one or more uncertain events using predictive algorithms and machine learning techniques, wherein the predictive algorithms are continuously trained based on reinforcement techniques;
   dynamically modifying, by the processor, the decision space based on the uncertain impact corresponding to the one or more uncertain events, wherein the decision space is modified by at least one of adding one or more decision options, and removing one or more decision options;
   generating, by the processor, a decision knowledge graph depicting each modification in the decision space based on the modified decision space;
   updating, by the processor, the decision space and the decision knowledge graph based on feedback, wherein the feedback is at least one of accepting and rejecting one or more decision options in the decision space;
   continuously training, by the processor, the predictive algorithms based on the feedback, wherein the predictive algorithms are continuously trained to dynamically modify the decision space based on the uncertain impact; and
   selecting, by the processor, the decision based on the updated decision knowledge graph and the updated decision space, wherein a final decision is selected post approval of the selected decision from the one or more human agents.

8. A non-transitory computer program product having embodied thereon a computer program for collaborative decision making in a dynamically changing environment, the computer program product storing instructions, the instructions comprising instructions for:
   receiving a query from a user using a graphical user interface (GUI), wherein the query corresponds to a problem requiring a decision;
   determining one or more intermediate steps required to reach the decision based on metadata associated to the problem, wherein the one or more intermediate steps are calculated using deep learning algorithms and artificial intelligence techniques;
   establishing a decision-making flow for the one or more intermediate steps required to reach the decision, wherein the decision-making flow corresponds to a sequence for execution of the one or more intermediate steps, and wherein the sequence is determined based on an importance and a severity of the one or more intermediate steps using deep learning algorithms;
   generating a decision space comprising one or more decision options, and wherein the one or more decision options are calculated based on the decision-making flow using artificial intelligence techniques and deep learning algorithms;
   crawling external data sources to automatically extract new information related to the decision space, wherein the external data sources comprise internet search, monitoring changes in published data repositories, subscription to market research services, and analysis of news and social media content;

determining merit of the new information based on a set of factors comprising historic judgements, consequences, and credibility of the external data source, wherein the merit is determined using at least Artificial Intelligence (AI) techniques, Mathematical Modelling, Markov Decision Modelling, and Deep Learning (DL) algorithms on the set of factors;

identifying one or more uncertain events based on the new information, wherein the one or more uncertain events cause an uncertain impact on the decision-making flow;

calculating the uncertain impact caused by the one or more uncertain events using predictive algorithms and machine learning techniques, wherein the predictive algorithms are continuously trained based on reinforcement techniques;

dynamically modifying the decision space based on the uncertain impact corresponding to the one or more uncertain events, wherein the decision space is modified by at least one of adding one or more decision options, and removing one or more decision options;

generating a decision knowledge graph depicting each modification in the decision space based on the modified decision space;

updating the decision space and the decision knowledge graph based on feedback, wherein the feedback is at least one of accepting and rejecting one or more decision options in the decision space;

continuously training the predictive algorithms based on the feedback, wherein the predictive algorithms are continuously trained to dynamically modify the decision space based on the uncertain impact; and selecting the decision based on the updated decision knowledge graph and the updated decision space, wherein a final decision is selected post approval of the selected decision from the one or more human agents.

9. The system as claimed in claim 1, wherein the one or more intermediate steps include at least one of receiving data from the one or more human agents, receiving feedback from the one or more human agents, analyzing data, generating the decision space, modifying the decision space, selecting the decision, and selecting the final decision.

\* \* \* \* \*